T. A. TATE.
FOLDING AUTOMOBILE SEAT.
APPLICATION FILED SEPT. 17, 1914.
1,170,123.
Patented Feb. 1, 1916.
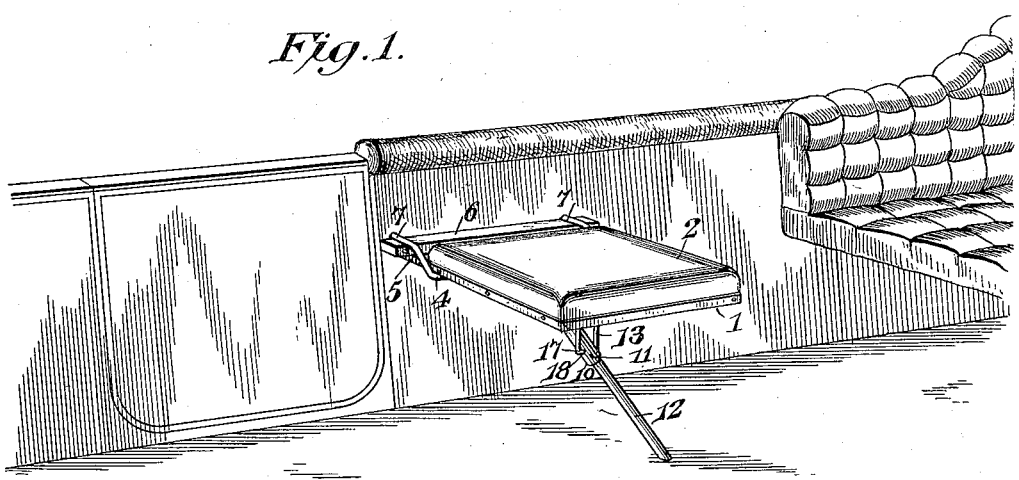
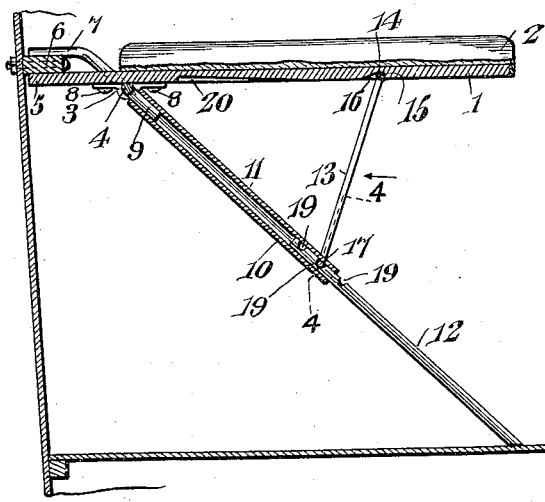
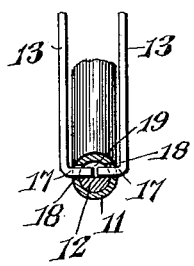
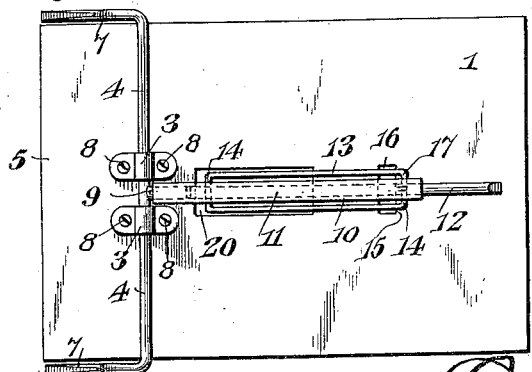
WITNESSES
Thomas A. Tate,
INVENTOR
BY
ATTORNEY

UNITED STATES PATENT OFFICE.

THOMAS A. TATE, OF LOWELL, ARIZONA.

FOLDING AUTOMOBILE-SEAT.

1,170,123.  Specification of Letters Patent.  Patented Feb. 1, 1916.

Application filed September 17, 1914. Serial No. 862,224.

*To all whom it may concern:*

Be it known that I, THOMAS A. TATE, a citizen of the United States, residing at Lowell, in the county of Cochise and State of Arizona, have invented a new and useful Folding Automobile-Seat, of which the following is a specification.

The invention relates to improvements in folding automobile seats.

The object of the present invention is to improve the construction of automobile seats and to provide a simple, practical, and comparatively inexpensive device of strong and durable construction, including a supporting member, a leg, and a brace, and designed for use in the construction of ironing boards, various kinds of tables, seats, and the like, where it is desirable to provide a horizontal supporting member and means for firmly and securely maintaining the same in position for use.

A further object of the invention is to provide a structure of this character, adapted to be readily folded and compactly arranged to enable it to be stored in a small space and to be conveniently shipped by parcel post and mail, as well as other means of transportation.

It is also an object of the invention to equip the device with an adjustable leg and with a combined locking device and brace, adapted to sustain the weight of the outer portion of the supporting member and capable also of locking the leg in its adjustment.

With these and other objects in view the invention consists in the construction and novel combination of parts hereinafter fully described, illustrated in the accompanying drawing, and pointed out in the claim hereto appended, it being understood that various changes in the form, proportion, size and minor details of construction, within the scope of the claim, may be resorted to without departing from the spirit or sacrificing any of the advantages of the invention.

In the drawing: Figure 1 is a perspective view of a foldable seat embodying the invention and shown applied to an automobile. Fig. 2 is a central vertical sectional view of the same. Fig. 3 is a reverse plan view, the parts being folded. Fig. 4 is a detail sectional view on the line 4—4 of Fig. 2.

Like numerals of reference designate corresponding parts in all the figures of the drawing.

In the accompanying drawing, in which is illustrated one embodiment of the invention, 1 designates a supporting member consisting of a board or piece upholstered at its upper face at 2 to form a seat, and provided at its lower face, near one end, with spaced transversely alined bearings 3 for the reception of a transverse shaft or pivot 4. The supporting member 1 may be constructed of any suitable material, and may be of any desired size, and while it is illustrated in the form of a seat in the accompanying drawing, yet it will be clear that it may constitute the top of a table or be in the form of an ironing board, or of any other desired form. The inner end 5 of the supporting member preferably extends beyond the upholstering to enable it to engage beneath a cleat 6, and the transverse shaft or pivot is provided at opposite sides of the supporting member with clamping arms 7, which engage the upper face of the cleat 6 and coöperate with the inner end 5 of the supporting member to firmly grip or clamp the said cleat and thereby securely fasten the said supporting member to the same. The transverse shaft or pivot 4 and the clamping arms 7 are designed to be constructed of malleable metal or other suitable material, and the said arms 7 are preferably of angular form, as clearly illustrated in Fig. 2 of the drawing. The outer engaging portion of the arm 7 is adapted to fit flat against the upper face of the cleat and be arranged in substantially a horizontal position, while the inner portion of the said arm 7 is arranged at an inclination. The bearings 3 are in the form of plates, secured at their terminals to the supporting member by screws 8, or other suitable fastening devices, and bowed at an intermediate point to conform to the configuration of the shaft or pivot, which is round in cross section.

The shaft or pivot 4 is provided at its center between the spaced bearings 3 with an attaching arm or shank 9, to which is secured a supporting leg 10 composed of upper and lower relatively adjustable sections 11 and 12. The upper section 11 is preferably constructed of tubular metal, as shown, to provide a socket for the reception of the central attaching arm or shank of the transverse shaft or pivot, but the upper section of the leg may be constructed of any other suitable material, and be secured to the transverse shaft or pivot in any other desired manner. The lower section 12, which may be either tubular or solid, telescopes into the upper section 11 for the purpose of adjustment, and also to enable the leg to be compactly arranged within the periphery of the supporting member to fold the parts and enable the same to be arranged in convenient form for storing or shipment, as illustrated in Fig. 3 of the drawing. The sections of the leg 10 are secured in their relative adjustment by means of a combined brace and locking device 13, composed of spaced sides and a connecting outer transverse end 14, which is adapted to engage a shoulder 15 formed by a notch 16 in the lower face of the supporting member 1 when the parts are arranged for use. The inner terminals 17 of the sides of the brace are bent inwardly at right angles to form projections which extend through opposite openings 18 in the sides of the upper tubular section 11 of the leg, and engage the lower section in a notch 19 thereof. The lower section is preferably provided with a plurality of notches, and the metal of the brace is designed to possess sufficient resiliency to enable the inwardly extending projections 17 to be readily sprung into and out of engagement with the lower section 12 of the leg. When the projections of the brace are sprung outwardly, the lower section of the leg is adapted to be moved inwardly into the upper tubular section, or drawn outwardly, as desired. The lower section of the leg is adapted to be moved into the upper section a sufficient distance to cause the leg to terminate short of the outer or front end of the seat when the parts are folded, as shown in Fig. 3, and the supporting member is provided in its lower face with a recess 20 to receive the free end of the link when the same is disengaged from the notch 16 and is folded upwardly and inwardly between the upper section of the leg and the supporting member or seat. The cleat 6 is shown applied to the side of an automobile in the accompanying drawing, but it may be mounted at any other desired point and the coacting clamping arms and the inner or rear end of the supporting member are adapted to engage any similar projecting part, such as the edge of a table, a ledge, shelf, or the like. The leg, which is inclined, extends downwardly and forwardly from the rear portion of the supporting member to a point approximately beneath the front end of the same, and the brace, which is arranged at an angle to the supporting leg, extends upwardly therefrom and is engaged with the notch 16. By this construction and arrangement the member 1 is firmly and rigidly supported in a horizontal position.

What is claimed is:—

A folding seat comprising a seat, a leg pivotally connected to the seat consisting of telescopic sections, one of the sections having a notch therein and the other section having openings in the wall thereof, and a brace comprising spaced sides provided with inwardly extending projections, said projections being received in the openings of one of the sections of the leg and adapted to be sprung into and out of engagement with the notched section of the leg, said brace being adapted to be swung into engagement with the seat for forming a support therefor.

In testimony that I claim the foregoing as my own, I have hereto affixed my signature in the presence of two witnesses.

THOMAS A. TATE.

Witnesses:
C. A. McDonald,
J. E. Clark.

Copies of this patent may be obtained for five cents each, by addressing the "Commissioner of Patents, Washington, D. C."